United States Patent [19]

Quinn, III

[11] 4,433,924
[45] Feb. 28, 1984

[54] THERMAL REFERENCE APPARATUS

[75] Inventor: Thomas G. Quinn, III, Pepperell, Mass.

[73] Assignee: Honeywell Inc., Minneapolis, Minn.

[21] Appl. No.: 303,433

[22] Filed: Sep. 18, 1981

[51] Int. Cl.³ .................................................. G01J 5/20
[52] U.S. Cl. .......................................... 374/2; 374/129
[58] Field of Search ..................... 374/2, 130, 126, 129

[56] References Cited

U.S. PATENT DOCUMENTS 3,309,881 3/1967 Beerman .................................. 374/2
3,694,624 9/1972 Buchta .................................... 374/2

Primary Examiner—S. Clement Swisher
Attorney, Agent, or Firm—John S. Solakian; Laurence J. Marhoefer

[57] ABSTRACT

A thermal reference source which includes a blackbody element and which is capable of being either heated or cooled based on a measured temperature of a scene of interest of an infrared system.

13 Claims, 3 Drawing Figures

THERMAL REFERENCE APPARATUS

BACKGROUND OF THE INVENTION

The Government has rights in this invention pursuant to Contract No. DAAK 11-79-C-0051 awarded by the Department of the Army.

The present invention relates generally to thermal reference sources and more particularly to a temperature controlled blackbody element of an infrared device.

Generally, infrared measurement systems require some type of a reference source, either for calibration or for signal reference levels. In the past, a reference source that was used, by way of an example, was a stack of razor like blades on edge through which the outside ambient air passes through by use of small fans. The stack of razor like blades was used to simulate a blackbody. The cavities in between such blades were placed at the proper spacing to form an almost ideal blackbody. Some of the disadvantages of such a sensor, however, are that it does require movement of air through it from the outside in order to maintain it at the outside air temperature. Generally, that temperature is the local temperature of the sensor, which, in all probability, is not representative of the temperature through the whole scene of interest, which may be 4 or 5 kilometers away. Adding to any such erroneous temperature representation is the fact that as the scene goes up in altitude the temperature varies substantially.

One of the requirements of a thermal reference source is to have a thermal reference source that allows either heating or cooling in order to achieve whatever the internal ambient temperature is. It may be desirable to remotely place the temperature measurement device either near the sensor or at some remote location. With a remote temperature sensor and the internal controlled reference source, the proper temperature can be maintained more accurately. As an example, the inside of the system could be at 35 C. and the air temperature could be at 15 C. In such case it is desirable to hold the blackbody reference at the 15 C., which would require cooling thereof. If the instrument had been in cold storage, or had been stored outside overnight, the inside of the system is quite cool, in which case the thermal reference needs to be heated in order to maintain the correct reference temperature.

Another problem which is encountered in infrared systems is "washout", which refers to the inability of the infrared sensor to discern one object from another. If everything in the scene of interest is at the same temperature and has the same emissivity, then everything looks the same, thereby making it impossible to discern one object from another. In order to determine whether "washout" exists, the use of a reference blackbody at the temperature of the scene of interest with a predicted or calculated emissivity is desirable.

It is accordingly a primary object of the present invention to provide an improved thermal reference apparatus that is capable of being either cooled or heated.

SUMMARY OF THE INVENTION

The above and other objects of the present invention are achieved by providing a thermal reference source which is the blackbody element itself and which is capable of being either cooled or heated based on a measured temperature at a point remote from, and preferably as close as possible, to the scene of interest of the infrared system. The temperature sensing element, i.e., the thermal reference source, which is a linear current source and is the blackbody or emitting element, by use of a ceramic or other substrate provides a substantially black radiating element in the selected bandwidth of the scene of interest.

BRIEF DESCRIPTION OF THE DRAWINGS

The above and other objects of the present invention are achieved in the illustrative embodiment as described with respect to the Figures in which.

DETAILED DESCRIPTION OF THE PREFERRED EMBODIMENT(S)

Figure 1:
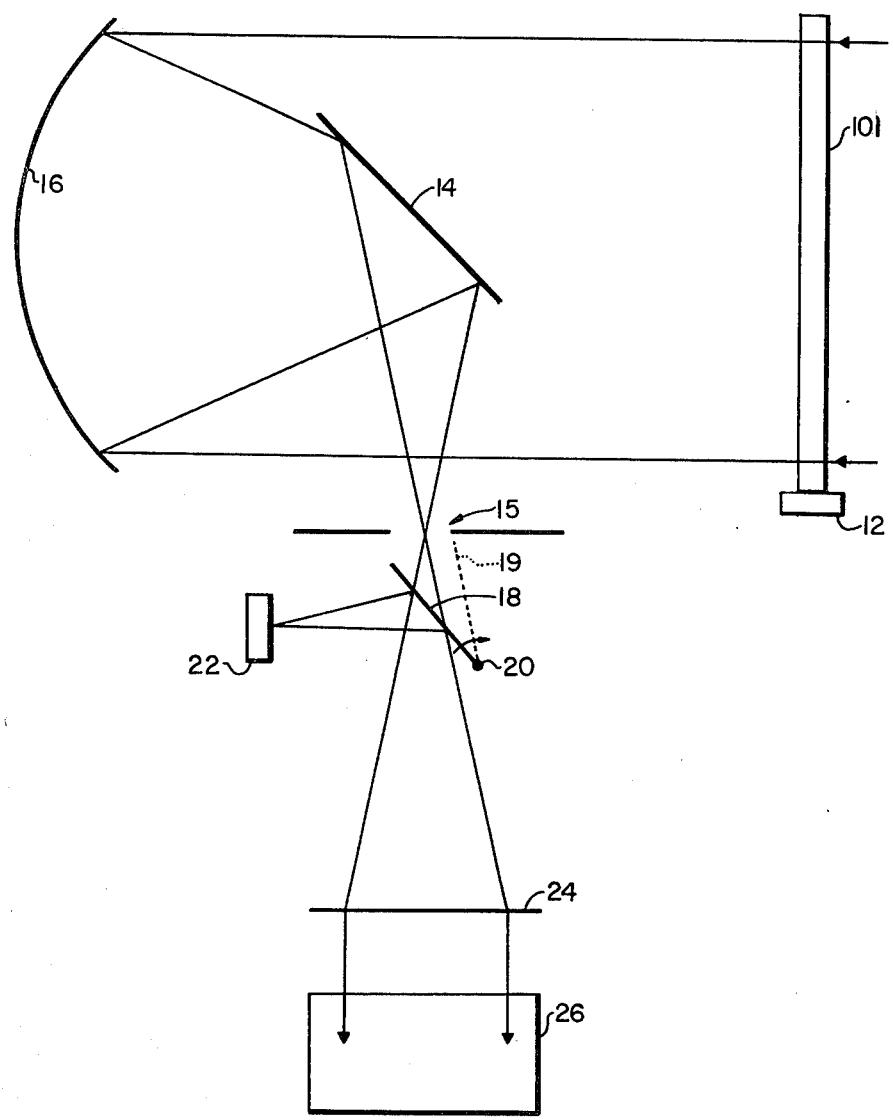
FIG. 1 illustrates a system in which the apparatus of the present invention operates.

Referring to FIG. 1, the optics in the infrared system with a thermal reference source shall now be described. The scene of interest is received through window 101 and is focused via telescopic lens 16 and telescopic secondary lens 14 down to field stop 15 and then normally through lens 24 into, for example, a spectrometer where the energy from the scene of interest is analyzed. This normal path is taken when the turning mirror 18 is in the position of the dotted line 19 as pivoted about pivot point 20. If it is deemed necessary by the system to look at the thermal reference source 22, then the turning mirror 18 is activated and rotated into the position as shown by the solid line in FIG. 1. At that point, the energy from the blackbody surface of the thermal reference source 22 is then sent to the spectrometer 26. The optics are configured such that the thermal reference source and radiating surfaces are approximately the same size and project optically the same energy as the energy that passes through the field stop 15. That is, the blackbody radiating element appears optically to the spectrometer 26 the same as the scene of interest. The only difference possibly in such appearance may be due to the emissivity, i.e., the scene may not have a common uniform emissivity, whereas the source has an emissivity of approximately one (1) representing a blackbody. The temperature of the source 22 is controlled by the remote temperature sensor 12 (normally separated from window 101), which ideally is located as close to the scene of interest as possible. The thermal reference source temperature is controlled to such temperature by measuring the temperature using the remote temperature sensor which is located at or is near the scene of interest. Thus, the temperature of the internal sensor 22 is being forced to the temperature of the remote sensor 12.

The purpose of a thermal reference source is to provide a blackbody or a calibrated source which is at the same temperature as the scene of interest. Therefore, the thermal reference source is forced to track the temperature of the remote temperature sensor. In practice, the remote sensor, as indicated above, is mounted as close as possible to the scene of interest, however, it may be mounted anywhere as dictated by overall system design. In fact, the remote sensor need not be a sensor at all, but rather a simulated signal set to direct the temperature desired for the source 22.

One of the two possible temperature sensors included in the system is used and is part of the thermal reference source 22. Its substrate is used as the emitter of the blackbody. The second temperature sensor 12 is used to monitor the temperature of the scene of interest, which is located outside of the instrument. The signal representing its measured temperature is used to control the temperature of the first temperature sensor located within the thermal reference source 22.

Figure 2:
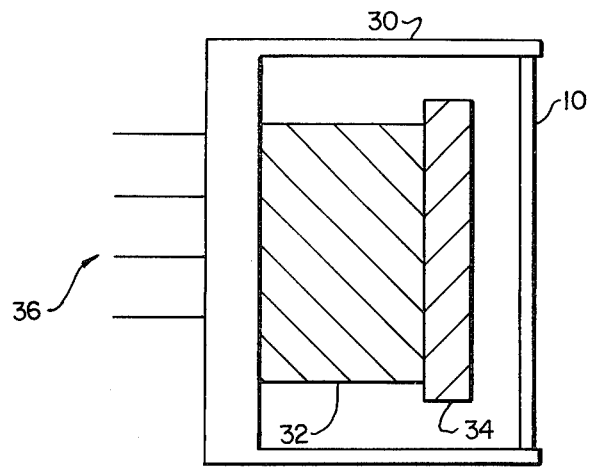
FIG. 2 illustrates the thermal reference source of the present invention.

FIG. 2 shows a diagram of thermal reference source 22. The source 22 may include a transistor size can 30, sometimes referred to as a TO-8 header, which is used as a heat sink. Can 30 includes an opening in which is housed a window 10 through which the radiation is transmitted. Window 10 may be made from zinc selenide material. Such window may be about one (1) millimeter thick. The material used for window 10 is picked based upon the bandwidth of the energy of the scene of interest. Located within can 30 is the thermoelectric device 32. A temperature sensor 34 which includes a ceramic substrate, is mounted on the thermoelectric device 32 with the ceramic substrate thereof facing toward window 10.

The temperature sensor 34 reads out the temperature by means of a linear signal in microamps per degrees Kelvin, and it is mounted directly on top of and in thermal contact with the thermal electric device 32, both of which are mounted inside of the can 30. The thermal electric device 32, commonly referred to as a thermal electric cooler, can be used to cool an object by supplying electrical power directly to it. It also can be used as a heater if the current flowing through the device is passed through in the opposite direction. In other words, in one current direction, the device acts as a cooler and if the current is reversed, it acts as a heater. The electrical leads 36 are used to supply power (2 leads) to the thermal electric cooler 32 and to carry current (2 leads) from the sensor 34.

The ceramic substrate of device 34 is used as the emitter of the blackbody. It has an emissivity measured in the order of 0.95 or higher. To increase the emissivity to as close as 1.00 as possible, a special flat black paint may be coated thereon or a different ceramic may possibly be used.

The temperature sensor of FIG. 2 is used for both elements 22 and 12, as shown in FIG. 1. Both elements 22 and 12 are typically temperature sensors, the devices of which may be matched sets. However, depending upon tolerance requirements, matching may not be required. The electronics may, in fact, be used to make any compensation as may be required.

Figure 3:
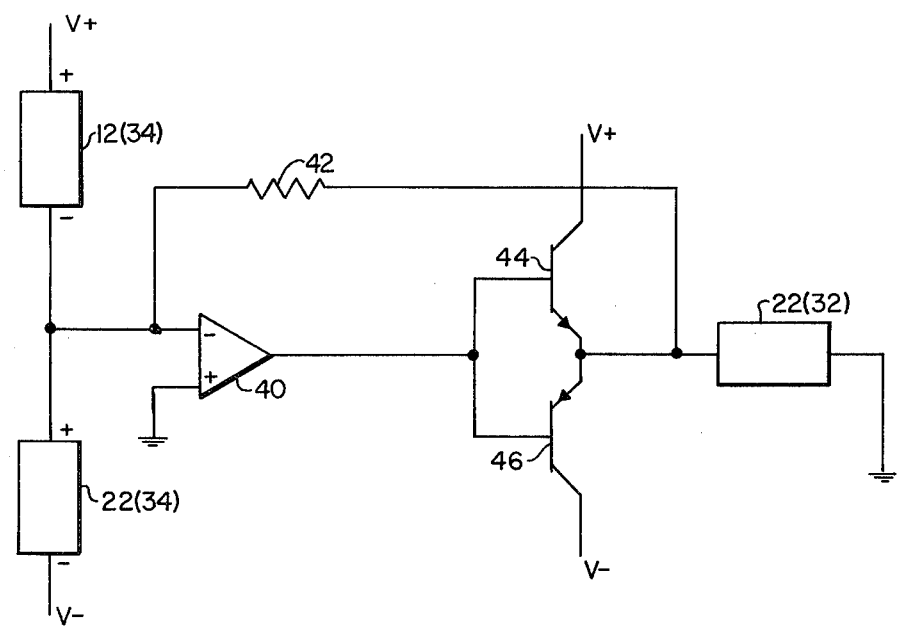
FIG. 3 illustrates the control circuitry utilized in conjunction with the thermal reference source of the present invention.

FIG. 3 is a schematic diagram of the circuitry used to control the thermal electric cooler. There are two temperatures that need to be measured. One is the temperature of the remote device 12 by use of its sensor 34. The other temperature is that of the actual blackbody element 22 by use of its sensor 34. These devices are set up in the circuit of FIG. 3, such that their currents are subtracted from each other. One current is negative and one is positive at the input to operational amplifier 40, which is the summing point thereof. Amplifier 40 in conjunction with feedback resistor 42, which represents the transimpedance of amplifier 40, converts the difference in current between elements 12 and 22 into a voltage. This voltage is then passed through the two transistors 44 and 46, depending upon whether the voltage out of amplifier 40 is positive or negative. If, for example, the voltage is positive, thereby indicating that one temperature sensor is at a higher temperature than the other one, then transistor 44 would be turned on and the current through the "cooler" 32 of device 22 would be from transistor 44 to ground. If the reverse is the case, then the voltage at the output of amplifier 40 would, for example, be negative at which point transistor 46 would be turned on and the flow of current would reverse through the "cooler" 32, thereby heating the device (or cooling it), depending upon which way the phasing is set up. Transistors 44 and 46 thus allow a change in the direction of the current through the "cooler" 32, thereby either heating or cooling the device.

Having described the invention, what is claimed as new and novel and for which it desired to secure Letters Patent is:

1. Thermal reference apparatus comprising:
   A. a housing having a first end and second end;
   B. an infrared window mounted in said first end of said housing;
   C. thermoelectric temperature control means mounted in proximity with said second end of said housing;
   D. a substrate in contiguous relationship with said control means, said substrate facing said window;
   E. wherein said control means is used to either heat or cool said substrate;
   F. wherein said substrate includes a temperature sensing means; and
   G. wherein said window is made from zinc selenide material.

2. Apparatus as in claim 1 wherein said housing is coupled as a heat sink for said control means.

3. Apparatus as in claim 1 further comprising means for providing a control input to said control means, said control input indicating whether said substrate is to be heated or cooled.

4. Apparatus as in claim 3 further comprising means for providing said control input so that the temperature of said substrate is set independent of the temperature of a scene of interest as viewed by an infrared system.

5. Apparatus as in claim 3 further comprising:
   A. a temperature sensor located near a scene of interest of an infrared system; and
   B. means for providing said control input by use of said temperature sensor.

6. Apparatus as in claim 1 wherein said substrate is made from ceramic material.

7. Apparatus as in claim 1 further comprising circuit means for providing current through said control means in one direction for the purpose of heating said substrate and in an opposite direction for the purpose of cooling said substrate.

8. Apparatus as in claim 7 further comprising a temperature sensor located near a scene of interest of an infrared system and wherein said circuit means comprises means for comparing a voltage or current indicative of the temperature of said temperature sensor and a voltage or current indicative of the temperature of said temperature sensing means, and for providing a signal generating said current in said one direction or said opposite direction depending upon the results of said system.

9. Apparatus as in claim 8 wherein said temperature sensing means is located in said infrared system.

10. Thermal reference apparatus comprising:
    A. a housing having a first end and a second end;
    B. an infrared window mounted in said first end of said housing;

C. thermoelectric temperature control means mounted in proximity with said second end of said housing;
D. a substrate in contiguous relationship with said control means, said substrate facing said window;
E. wherein said control means is used to either heat or cool said substrate;
F. wherein said substrate includes a temperature sensing means;
G. circuit means for providing current through said control means in one direction for the purpose of heating said substrate and in an opposite direction for the purpose of cooling said substrate; and
H. a temperature sensor located near a scene of interest of an infrared system and wherein said circuit means comprises means for comparing a voltage or current indicative of the temperature of said temperature sensor and a voltage or current indicative of the temperature of said temperature sensing means, and for providing a signal generating said current in said one direction or said opposite direction depending upon the results of said system.

11. Apparatus as in claim 10 wherein said window is made from zinc selenide material.

12. Thermal reference apparatus comprising:
A. a housing having a first end and a second end;
B. an infrared window mounted in said first end of said housing;
C. thermoelectric temperature control means mounted in proximity with said second end of said housing;
D. a substrate in contiguous relationship with said control means, said substrate facing said window;
E. wherein said control means is used to either heat or cool said substrate;
F. wherein said substrate includes a temperature sensing means;
G. means for providing a control input to said control means, said control input indicating whether said substrate is to be heated or cooled;
H. a temperature sensor located near a scene of interest of an infrared system; and
I. means for providing said control input by use of said temperature sensor.

13. Apparatus as in claim 10 wherein said temperature sensing means is located in said infrared system.

* * * * *